United States Patent [19]

Brann et al.

[11] 4,371,929
[45] Feb. 1, 1983

[54] MULTIPROCESSOR SYSTEM WITH HIGH DENSITY MEMORY SET ARCHITECTURE INCLUDING PARTITIONABLE CACHE STORE INTERFACE TO SHARED DISK DRIVE MEMORY

[75] Inventors: John J. Brann, Manassas, Va.; Charles S. Freer, Jr., Westminster, Md.; Warren W. Jensen, Warrenton, Va.

[73] Assignee: IBM Corporation, Armonk, N.Y.

[21] Appl. No.: 146,897

[22] Filed: May 5, 1980

[51] Int. Cl.[3] .................... G06F 13/00; G06F 13/04; G06F 13/08; G06F 9/00
[52] U.S. Cl. ................................. 364/200; 364/134
[58] Field of Search ... 364/200 MS File, 900 MS File, 364/134

[56] References Cited

U.S. PATENT DOCUMENTS

| 3,676,846 | 7/1972 | Busch | 364/200 |
|---|---|---|---|
| 3,938,097 | 2/1976 | Niguette | 364/200 |
| 3,967,247 | 6/1976 | Andersen | 364/200 |
| 4,075,686 | 2/1978 | Calle et al. | 364/200 |
| 4,080,651 | 3/1978 | Cronshaw et al. | 364/200 |
| 4,096,567 | 6/1978 | Millard et al. | 364/200 |
| 4,110,830 | 8/1978 | Krygowski | 364/200 |
| 4,145,739 | 3/1979 | Dunning et al. | 364/200 |
| 4,156,906 | 5/1979 | Ryan | 364/200 |
| 4,161,024 | 7/1979 | Joyce et al. | 364/200 |
| 4,181,937 | 1/1980 | Hattori et al. | 364/200 |
| 4,214,303 | 7/1980 | Joyce et al. | 364/200 |
| 4,215,400 | 7/1980 | Denko | 364/200 |
| 4,313,161 | 1/1982 | Hardin et al. | 364/200 |

*Primary Examiner*—James D. Thomas
*Assistant Examiner*—Archie E. Williams, Jr.
*Attorney, Agent, or Firm*—John E. Hoel

[57] ABSTRACT

In a multiprocessor system, a controllable cache store interface to a shared disk memory employs a plurality of storage partitions whose access is interleaved in a time domain multiplexed manner on a common bus with the shared disk to enable high speed sharing of the disk storage by all of the processors. The communication between each processor and its corresponding cache memory partition can be overlapped with each other and with accesses between the cache memory and the commonly shared disk memory. The addressable cache memory feature overcomes the latency delay which inherently occurs in seeking the beginning of a region to be accessed on the disk drive mass storage.

12 Claims, 13 Drawing Figures

INTERLEAVED HOST ADAPTER OPERATIONS

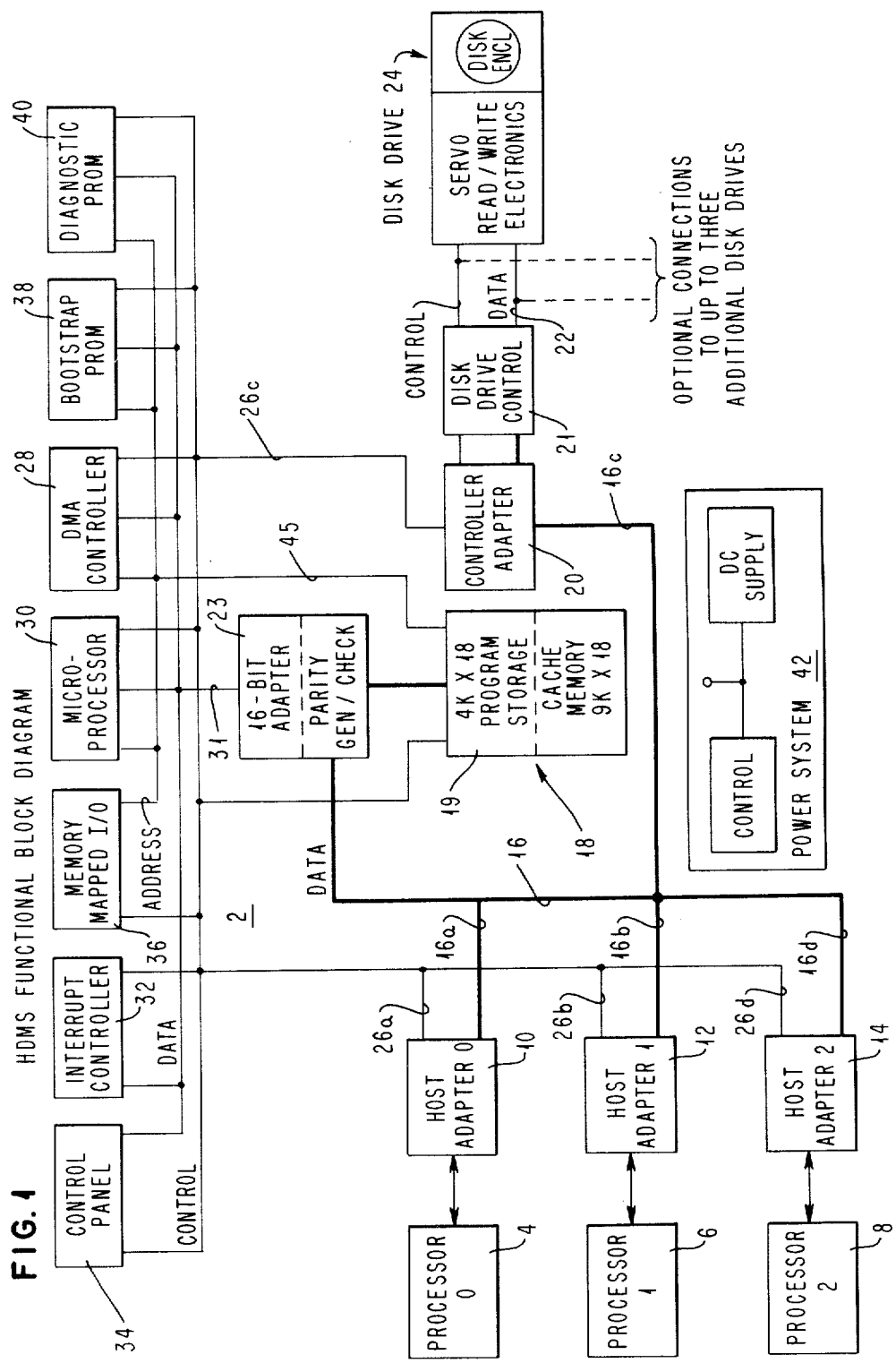

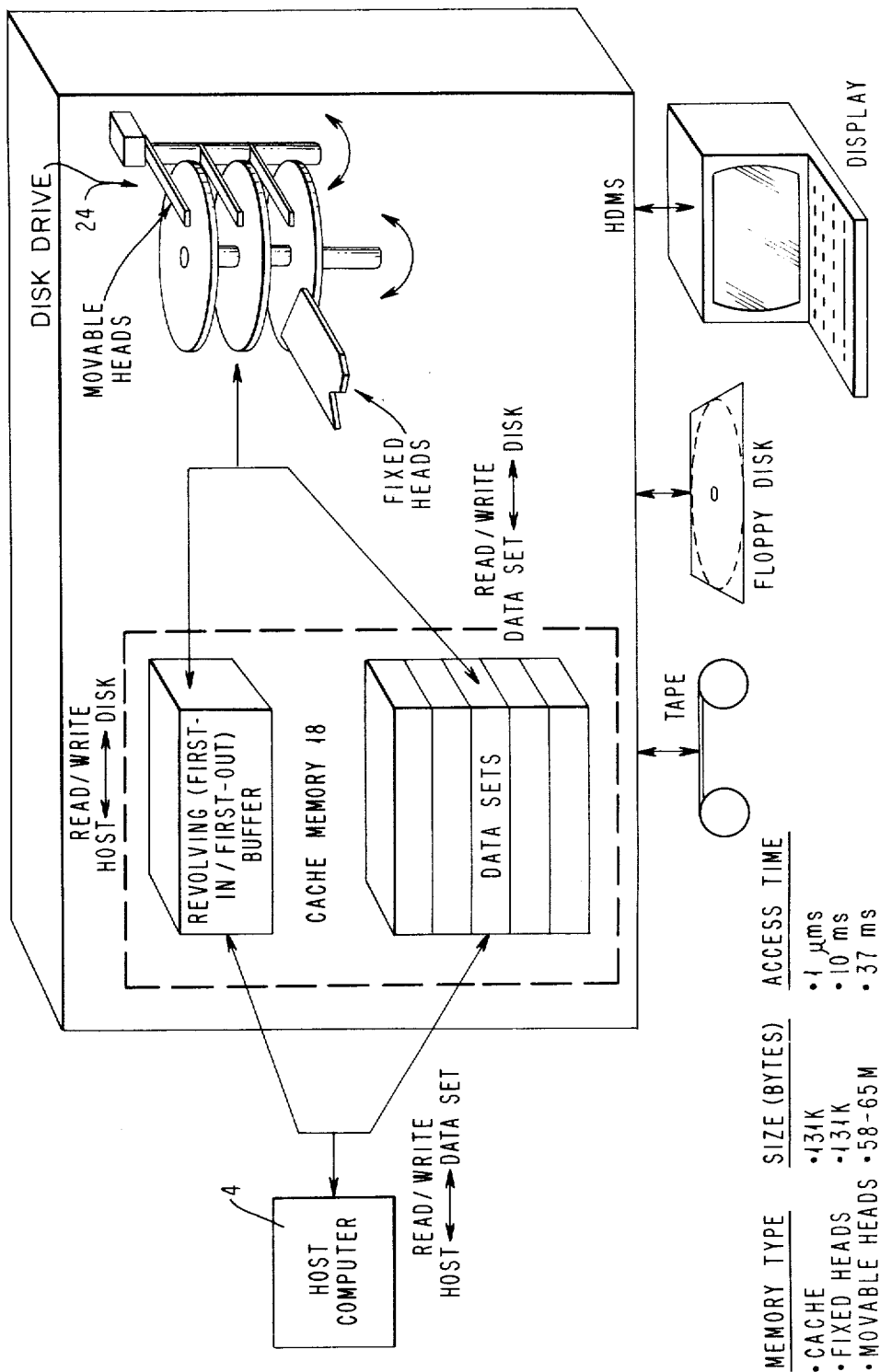

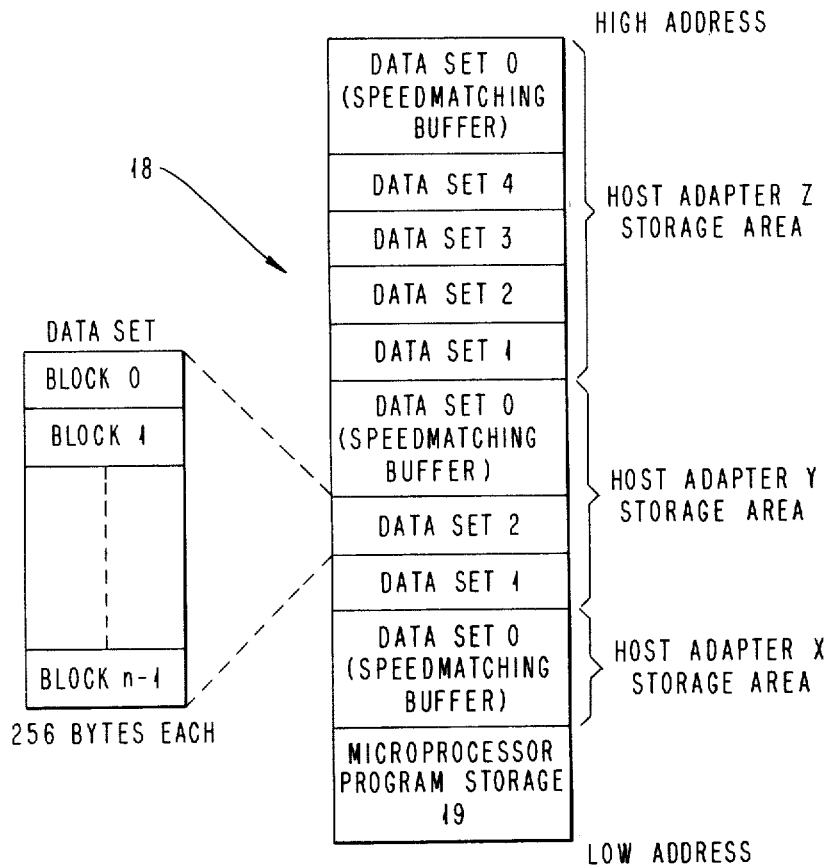

FIG. 4  OVERLAPPED OPERATIONS VIA COMMAND CHAINING
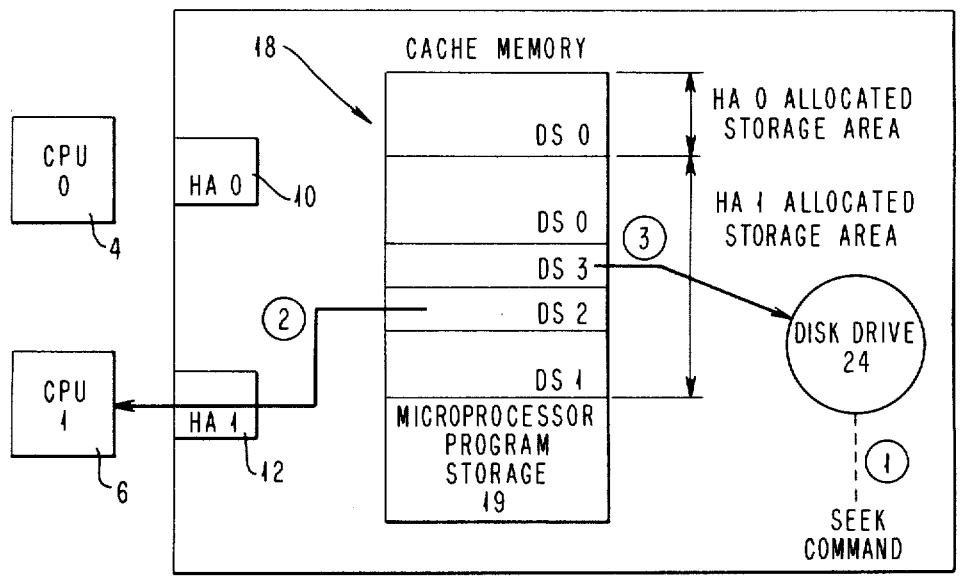
FIG. 5  INTERLEAVED HOST ADAPTER OPERATIONS
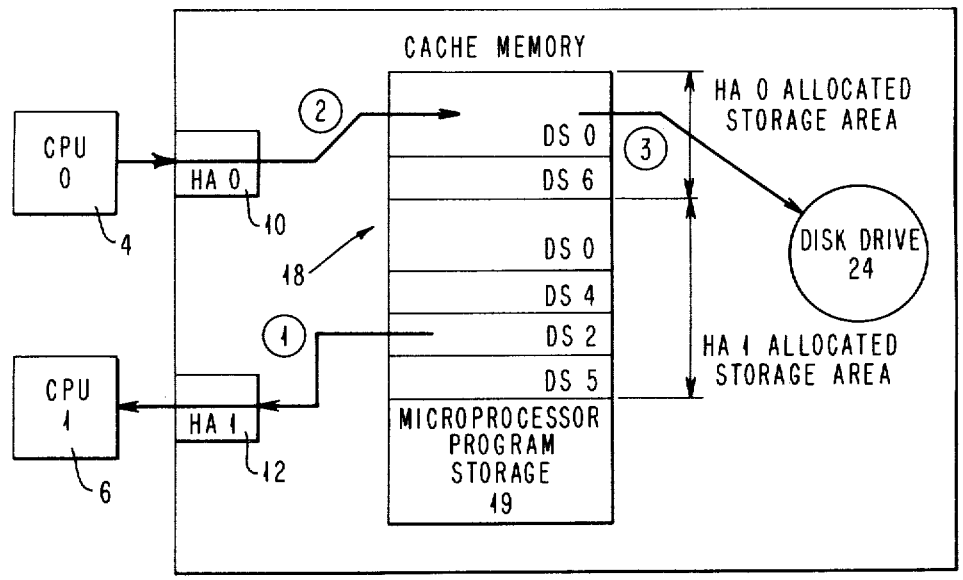

FIG. 6A  HDMS COMMAND FORMATS

FIG. 6B — HDMS COMMAND FORMATS

| Command Group | Command | First Word bits [7:0] |
|---|---|---|
| MEMORY CONTROL | ALLOCATE | 0 0 0 0 0 0 0 1 |
| | DEFINE DATA SET | 0 0 0 0 0 0 1 0 |
| | DELETE DATA SET | 0 0 0 0 0 0 1 1 |
| | CLEAR DATA SET | 0 0 0 0 0 1 0 0 |
| | COMPACT DATA SET | 0 0 0 0 0 1 0 1 |
| | RESET SYSTEM ALLOCATION | 0 0 0 0 0 1 1 0 |
| DISK / DATA SET | READ DISK TO DATA SET | 0 0 0 0 1 0 0 1 |
| | WRITE DATA SET TO DISK | 0 0 0 0 1 0 0 0 |
| | READ DATA SET | 0 0 0 0 0 1 1 0 |
| | WRITE DATA SET | 0 0 0 0 0 1 1 0 |
| | FORMAT | 0 0 0 0 0 1 0 1 |
| | SET LOCK | 0 0 0 0 0 0 0 1 |

Word bit layout (bits 15..0):

ALLOCATE (first word shown as SPARE; second word):
- CH | DATA SET NUMBER | SPARE | BLOCK COUNT

DEFINE / DELETE / CLEAR / COMPACT DATA SET:
- CH | 1 | DRIVE | IE/RP | R/W KEY | SPARE | STARTING BLOCK NUMBER
- second word: 1 | SP | STARTING REC | RECORD COUNT

READ DISK TO DATA SET / WRITE DATA SET TO DISK:
- CH | 1 | DRIVE | IE/RP | R/W KEY | DATA SET NUMBER | SPARE | STARTING BLOCK NUMBER
- second word: 1 | V | STARTING REC | RECORD COUNT
- SPARE

READ DATA SET / WRITE DATA SET:
- CH | DATA SET NUMBER | SPARE | BLOCK COUNT
- second word: 1 | SP | STARTING BLOCK

FORMAT / SET LOCK:
- CH | SP | DRIVE | RECORD LENGTH (WORDS)
- second word: SPARE | O P O | READ LOCK | WRITE LOCK

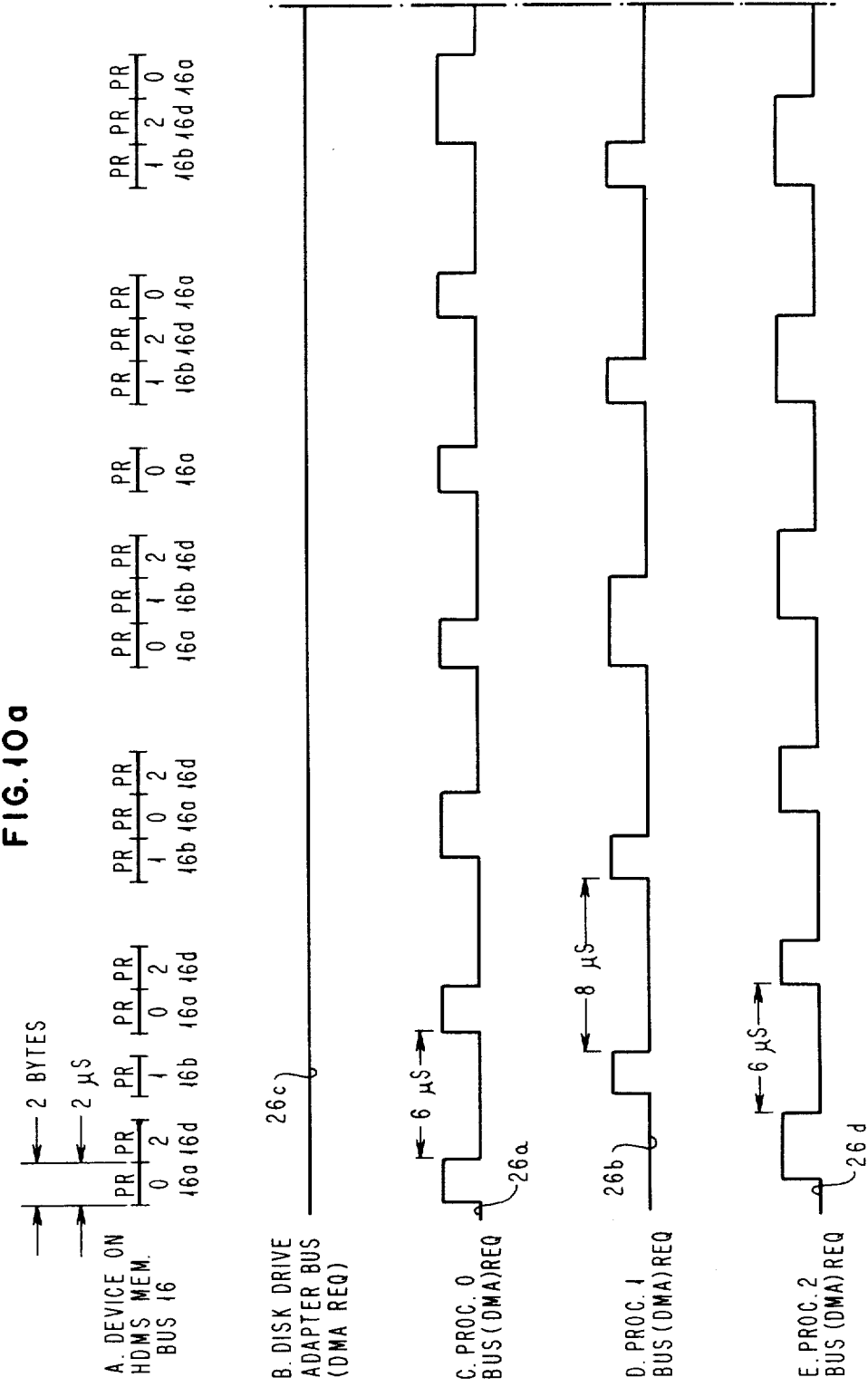

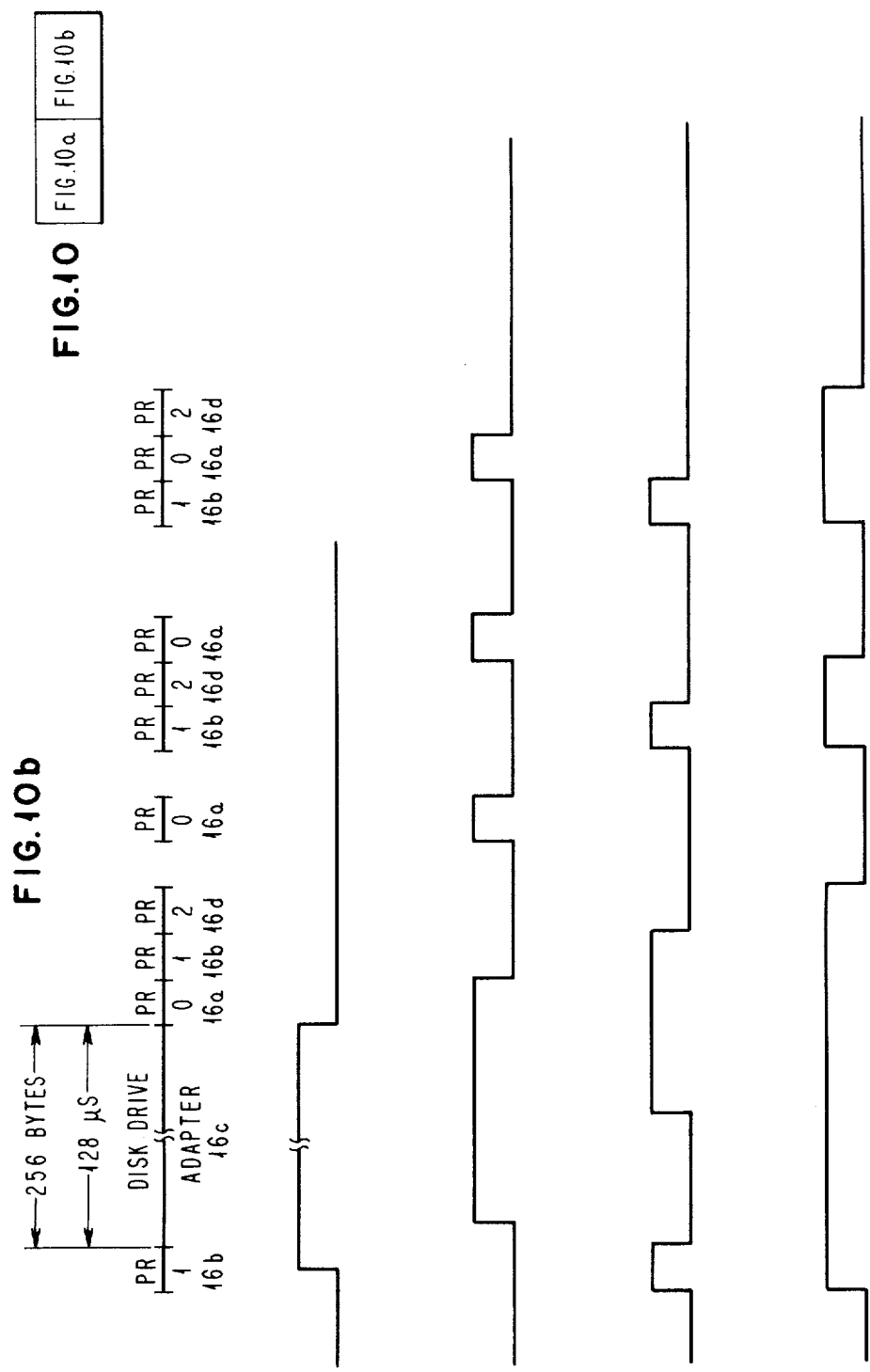

MULTIPROCESSOR SYSTEM WITH HIGH DENSITY MEMORY SET ARCHITECTURE INCLUDING PARTITIONABLE CACHE STORE INTERFACE TO SHARED DISK DRIVE MEMORY

FIELD OF THE INVENTION

The invention disclosed broadly relates to data processing systems and more particularly relates to multiprocessor systems.

BACKGROUND OF THE INVENTION

Multiprocessor systems employing miniprocessors or microprocessors, have become a powerful means for carrying out distributed processing functions. These distributed processors have a need for rapid access time mass storage capable of storing millions of words of operational and diagnostic programs, permanent data, and intermediate results. Distributed processing creates the demand for higher system performance for mass storage. The prior art has employed memory and buffering arrangements for digital computers using a conventional architecture for a cache memory by a single processor communicating with a bulk storage device. There has been no adequate solution in the prior art, however, for sharing a bulk storage device with a plurality of distributed processing elements.

OBJECT OF THE INVENTION

It is therefore an object of the invention to provide a shared bulk storage architecture for a plurality of distributed processing elements having a higher system performance than has been available in the prior art.

SUMMARY OF THE INVENTION

These and other objects, features and advantages of the invention are accomplished by the high density memory set invention disclosed herein. In a multiprocessor system, a controllable cache store interface to a shared disk drive memory employs a plurality of storage partitions whose access is interleaved in a time domain multiplexed manner on a common bus with the shared disk to enable high speed sharing of the disk storage by all of the processors. The communication between each processor and its corresponding cache memory partition can be overlapped with each other and with accesses between the cache memory and the commonly shared disk drive memory. The addressable cache memory feature overcomes the latency delay which inherently occurs in seeking the beginning of a region to be accessed on the disk drive mass storage.

DESCRIPTION OF THE FIGURES

FIG. 1 is a functional block diagram of the high density memory set (HDMS) architecture.

FIG. 2 is a schematic diagram of the HDMS hierarchial memory concept.

FIG. 3 is a schematic diagram of the HDMS data space in the cache memory.

FIG. 4 is a schematic depiction of the HDMS overlapped operations via command chaining.

FIG. 5 is a schematic depiction of the HDMS interleaved host adapter operations.

FIGS. 6A and 6B are a depiction of the HDMS command formats.

FIGS. 10A and 10B are a timing diagram, for an example of the operation of the invention.

DISCUSSION OF THE PREFERRED EMBODIMENT

In a multiprocessor system, a controllable cache store interface to a shared disk drive memory employs a plurality of storage partitions whose access is interleaved in a time domain multiplexed manner on a common bus with the shared disk drive to enable high speed sharing of the disk storage by all of the processors. The communication between each processor and its corresponding cache memory partition can be overlapped with each other and with accesses between the cache memory and the commonly shared disk drive memory. The addressable cache memory feature overcomes the latency delay which inherently occurs in seeking the beginning of a region to be accessed on the disk drive mass storage.

The high density memory set (HDMS) architecture disclosed herein, provides a hierarchy of storage media as shown in FIG. 2, including a large volume of data accessible with movable heads; 131,000 bytes of disk data accessed in an average of 10 milliseconds by optional fixed heads, thereby eliminating disk seek delays and up to 131,000 bytes of solid state cache memory available at microsecond speeds. Commands which support this hierarchical architecture allow the user to define data sets within the cache memory 18 to permit flexible data transfers among the plurality of host computers 4, the cache memory 18, and the fixed and movable heads of the disk drive 24, providing a manyfold improvement in the performance over that available in current disk files.

Overall Description of the HDMS System

Figure 9:
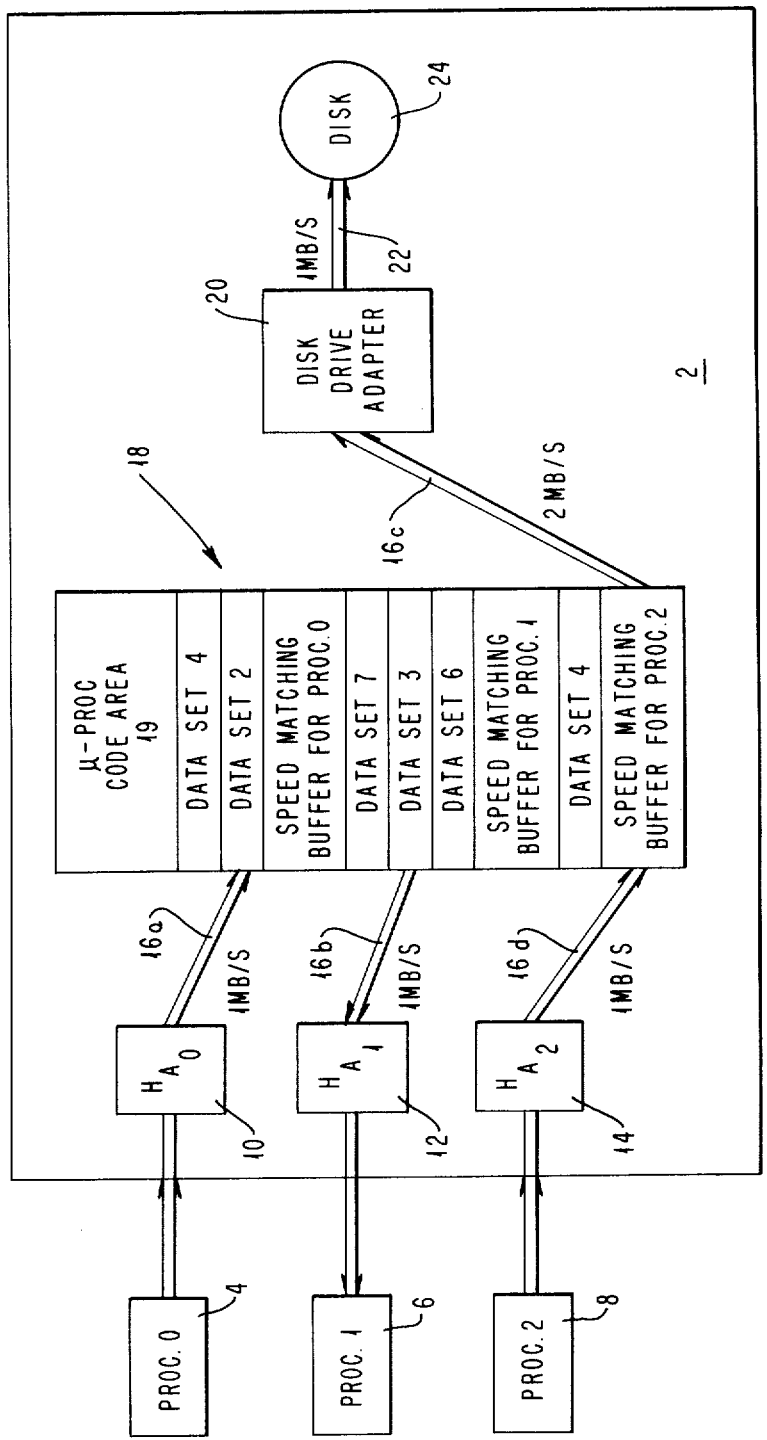
FIG. 9 is a schematic diagram of the HDMS system, for an example of the operation of the invention.

FIGS. 1 and 9 show functional block diagrams of the high density memory set invention. A plurality of distributed processors 4, 6 and 8 are connected to corresponding host adapters 10, 12 and 14 which communicate on a time domain multiple access interleaved basis at an instantaneous rate of 1 megabyte per second over the common bus 16 with the cache memory 18. The disk drive adapter 20 is also connected to the common bus 16 and transfers data between the disk drive 24 and the cache memory 18. Operative control over these data transfers is exercised by the control panel 34, interrupt controller 32, memory mapped I/O 36, microprocessor 30, direct memory access (DMA) controller 28, programmable read only memory (PROM) 38, and diagnostic PROM 40. The microprocessor 30 communicates with a program storage portion 19 of the cache memory 18 via a 16 bit adapter and parity generator checker 23 over the line 31.

The cache memory 18 has a relatively high access rate, with a data terminal connected to the common bus 16 which communicates in common with the multiple host adapters 10, 12, 14, etc. and with the disk drive adapter 20. The cache memory 18 is partitioned into storage regions uniquely associated with each host adapter 10, 12, 14, etc. The disk drive adapter 20 includes a disk memory buffer having a high speed data terminal connected to the bus 16 and another data terminal connected through the disk drive control and the line 22 to the disk drive 24.

Figure 7:
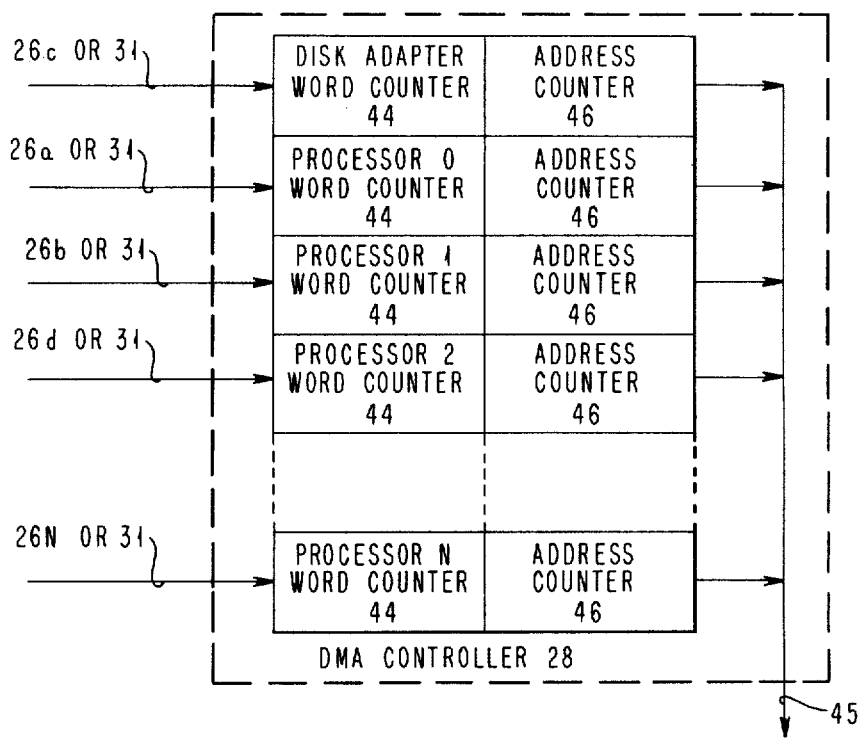
FIG. 7 is a schematic diagram of the DMA controller counters.

The DMA controller 28 operates as a bus allocation scanner under the control of a microprocessor 30, with a port-to-cache memory transfer demand input 26a from the host adapter 10, 26b from the host adapter 12, 26d from the host adapter 14, and etc. to transfer demand inputs from the processors. A word counter 44 and an address counter 46 in the DMA controller 28 shown in FIG. 7 are associated with each of the host adapters 10, 12, 14, etc. to monitor the number of bytes of data loaded from a host adapter into its corresponding partitioned portion of the cache memory 18, and indicating when a block of data has been accumulated in the cache memory partition which can be transferred to the disk drive adapter 20 via its time divided access to the bus 16. The DMA controller 28 scans the demand inputs and allocates time divided access to each of the host adapters and the disk drive adapter 20 to the common bus 16 in response to the demands of each host adapter for access to the bus and the state of accumulated data in the cache memory 18 as perceived by the word counter 44 in the DMA controller 28. In this manner, data can be transferred between the plurality of processors and the cache memory and between the cache memory and the buffer in the disk drive adapter 20 on a time divided basis.

The functions performed by the HDMS 2 upon receipt of commands from a host processor 4, 6 or 8, are:

SEEKING

Positions the movable read/write heads in the disk drive 24 at one of 358 cylinders. Two additional cylinders are reserved for internal use.

WRITING DATA SET

Accepts data from the data processor 4, 6, 8 etc. and records it in a specified area of the controller cache memory 18.

READING DATA SET

Transfers data from a specified area of the controller cache memory 18 to the data processor 4, 6, 8, etc.

WRITING DATA

Accepts data from the data processor 4, 6, 8, etc. and records it in the specified storage area on the disk surface(s) of the disk drive 24 for future retrieval.

READING DATA

Responds to the data processor 4, 6, 8 upon request for data from a specified storage area. Retrieves the data from the disk surface(s) of the disk drive 24 and transfers it to the data processor 4, 6, or 8.

STATUS

Transmits its status (via an Interrupt word) upon receipt of a STATUS REQUEST command and in response to every command or block of commands sent by the data processor 4, 6, or 8.

MEMORY ALLOCATION AND CONTROL

Provides the capability to partition the available controller cache memory 18 into a specified number of 256-byte blocks. Partitioning of an allocated memory space into data sets consisting of a specified number of blocks is also possible.

WRITE DATA SET TO DISK

Records data previously placed in the HDMS controller cache memory 18 in the specified storage area on the disk surface(s) of the disk drive 24 for further retrieval.

READ DISK TO DATA SET

Retrieves data from the specified storage areas on the disk surfaces of the disk drive 24 and places the data in the HDMS controller cache memory 18.

DETAILED HDMS DESCRIPTION

A block diagram of the major functional elements of the HDMS is shown in FIG. 1. All data to be written to the cache memory 18 or disk drive 24 enters the appropriate host adapter (HA) 10 data register. Data words from a host processor 4 are transferred in blocks of 128 16-bit words of two 8-bit bytes each, via direct memory access (DMA) from the HA data register to a predetermined location in the cache memory 18, one word at a time, until a preprogrammed DMA word count has been exhausted or until an interface timeout occurs. The data to be written on the disk drive 24 is transferred to the controller adapter (CA) 20 from the cache memory 18, also via DMA. A block of 128 words is transferred one word at a time before the DMA relinquishes bus 16 control to the microprocessor 30.

Data in the CA 20 data register is then transferred to the disk drive controller (DDC) 21. Parity is generated on each byte of a data word transferred to the DDC from the CA. If a parity error is encountered, a nonmaskable interrupt is generated to the microprocessor 30 and the data transfer is terminated. Eighteen bits (16-bits of data plus 2-bits of parity) are involved in each DDC data word transfer.

Data transfers from the DDC 21 to the host processor 4, 6, 8 follow the reverse procedure. Data words entering the CA 20 data register from the DDC 21 contain a parity bit on each byte. This parity is checked against the actual parity for a possible error. If a parity error is encountered, a nonmaskable interrupt is generated to the microprocessor 30 and the data transfer is terminated. Data words from the CA 20 are transferred in blocks of 128 words to the cache memory 18. Data contained in cache memory 18 is then transferred to the HA 10 data register by the DMA logic. A data word contained in the HA 10 data register is transferred to a host system 4 via the appropriate interface protocol.

The major elements of the HDMS are:

MICROPROCESSOR 30

Performs the basic control functions of the HDMS. A programmable read only memory (PROM) 38 is included in the DMA/HDMS controller for storage of the bootstrap program for initial program loading (IPL) of the microprocessor 30 from non-user-addressable tracks on the disk drive 24. The functions performed by the microprocessor include initialization and control of the DMA controller 28 and Interrupt Controller (IC) 32 within the HDMS controller; host data processor 4, 6, 8 etc. command interpretation and execution; generation of the command response; generation of control data blocks to be executed by the DDC 21, and generation of interrupt processing.

HOST ADAPTER (HA) 10, 12, 14, ETC.

Provides the interface between the host data processor 4, 6, 8, etc. and the HDMS. The HDMS can contain up to six HAs 10, each of which interfaces with an I/O channel. The HDMS, operating with a single host data processor 4, accommodates a maximum channel data rate of 250K words per second and data rates as low as 5K words per second.

The HA 10 has the capability to detect the presence of a Forced External Function, as External Function signal received in the absence of an active External Function Request signal. The occurrence of a Forced External Function causes an active output data request (ODR), input data request (IDR), or external interrupt request (EIR) to be reset, thus automatically terminating any active data or interrupt word transfer. The HDMS HA 10, 12, 14 also detects the presence of an IPL command which actuates the HDMS bootstrap PROM 38 for the microprocessor IPL.

The HA 10, 12, 14 terminates any input or output data operation when the host processor fails to respond with an Input Acknowledge or Output Acknowledge pulse, for NTDS channels attached to a host processor, within 200 microseconds of the HDMS-initiated IDR-/ODR.

PROGRAMMABLE INTERRUPT CONTROLLER (PIC) 32

Handles all interrupts of the microprocessor 30 originating from other modules within the HDMS controller and DDC 21. The PIC 32 processes up to eight interrupts, provides a program controlled capability of masking interrupt requests, and provides a microprocessor program controlled interrupt priority servicing capability. The following operations within the HDMS generate interrupts to the microprocessor 30.

1. Controller adapter 20 DMA word count transfer complete.
2. Controller adapter 20 end of operation.
3. Host adapter 10, 12, 14, etc. DMA word count transfer complete, interface time out for input and output data or command word transfers, and end of command block transfer complete (chain bit =0).
4. Forced EF command issued by host processor 4, 6, 8 etc.
5. Memory 18, controller adapter 20, or, disk drive control 21 parity error.

The PIC 32 is programmed in the fixed priority mode with the DMA word count complete interrupt having the highest priority followed in sequence by HA 0 DMA word count timeout or command block transfer complete interrupt through HA 5 MDA word count timeout or command block complete interrupt, CA 20 end of operation interrupt, and HA 0 Forced EF command present interrupt through HA 5 Forced EF command present interrupt which have the lowest priority.

MEMORY MAPPED I/O DECODER (MMIOD) 36

Provides 16-bit address decoding to enable the microprocessor instruction set to select external devices such as the HA 10 status and control register, DMA 28 base and block count registers, PIC 32 mode and command registers, and controller adpater data registers as memory references. The MMIOD 36 has the capability of decoding a maximum of 128 contiguous 16-bit addresses.

CONTROLLER CACHE MEMORY 18

Provides up to 131,000 bytes of solid-state random access memory (RAM) storage. The microprocessor program and data storage occupies 8K bytes in region 19 of the cache 18. The remaining bytes are dedicated to the read/write data buffer function for (a) speed matching the DDC 21 with the host processor 4, 6, 8 etc. data channels, or (b) for use by the host data processor 4, 6, 8 etc. as an additional storage facility without actually writing the data on the disk drive.

DIRECT MEMORY ACCESS CONTROLLER (DMAC) 28

Provides the capability of cycle stealing (a) data from either the HA 10, 12, 14 or the CA 20 to the controller cache memory 18, or (b) data from the controller cache memory 18 to either the HA 10, 12, 14 or CA 20. The DMAC 28 provides interleaved HA 10, 12, 14 and CA 20 data cycle steal operations. It has an addressing range of 64K addresses and is able, under microprocessor program control 30, to operate in either burst, demand, or single word transfer mode. The DMAC 28 is programmed in a rotating priority mode. After recognition of any DMA channel for service, neither the disk drive 24 nor other HAs 10, 12, 14 can interfere until the service is complete, at which time the scan for DMA service requests in initiated by the DMAC 28, starting at the next DMA device in the sequence. All DMA operations in the HDMS interrupt the microprocessor 30 for the duration of the DMA service. An example of the DMA Controller 28 is the Intel 8257 Programmable DMA Controller which is described in the publication "MCS-85 TM Users Manual" pages 4-51 to 4-69, published by the Intel Corporation, June 1977.

CONTROLLER ADAPTER (CA) 20

Interfaces the microprocessor 30, memory mapped I/O 36, controller cache memory 18, interrupt controller 32, and the DMAC 28 with the DDC 21. The CA 20 provides DMA transfer of data to and from the DDC 21. It also is an interface to the DDC 21 for the issuance of file control blocks to the microcontroller in the DDC 21 and for the reception of status and end-of-processing interrupt requests from the DDC 21.

DISK DRIVE CONTROLLER (DDC) 21

Provides the interface between the CA 20 and the disk drive 24 and interfaces with up to four disk drives. The DDC 21 is comprised of a serializer/deserializer, tag in/out buffers, a programmable logic array (PLA) microcontroller, a RAM for a data buffer plus file control block (FCB) store, and miscellaneous timing and control logic functions. The adapter provides such functions as serialization/deserialization of read/write data, cyclic redundancy check (CRC) generation and checking, seek controls, buffering of data and read/write data transfer.

The DDC 21 also performs automatic error recovery processing unless this capability is inhibited when the user sets the inhibit error recovery procedure (IERP) bit in the HDMS commands. The following is a list of the errors associated with the file which are retried when IERP is not inhibited. Included in this list also is the number of retries to be effected before an error response is returned to the user and the command to the file is terminated along with command block processing.

| Error | Retry Count |
|---|---|
| CRC Check | 8 |
| No Record Found (NRF) Check | 8 |
| Missing Sector Pulse Check | 8 |
| File Not Ready Check | 1 |
| Data Unsafe Check | 1 |
| CRC on Write Verify | 0 |
| Write Gate Return Check | 4 |

When a CRC check, NRF check, or missing sector pulse check occurs, a full revolution will occur before the data operation is retried. The retry on a file not ready check or data unsafe check can require up to two seconds before the check is either cleared or an error response is returned to the user.

The CRC check provides for the incorporation of an error detection capability. Each field of information (identifier (ID) and data record) written on the disk has appended to it an error detection code of 16 bits generated by DDC 21. The code is capable of detecting any error burst 16 bits or less in length.

On a read operation the CRC bytes are regenerated from the data and a comparison made by the DDC 21 with the recorded CRC bytes. A comparison error generates a CRC check, and the host computer issuing a command which resulted in a CRC check from the data read from the disk is informed of the CRC check via an Interrupt word.

POWER SYSTEM 42

Provides 8 dc voltages, EMI filtering, power sequencing, and ac drive motor power. A 60 Hz, 208 Volt ac, 3-phase wye power source is utilized; other input power source compatibility can be optionally provided. The power system is designed to prevent damage due to interruption or degradation of any internal dc power supply.

DIAGNOSTIC 40 AND BOOTSTRAP 38 FORMS

Are actuated when (a) power is initially applied, (b) an IPL External Function is detected by a HA 10, 12, 14, or (c) when the control panel Reset pushbutton is depressed. The diagnostic PROM 40 is selected by the control panel switch. These PROMs contain gross functional tests of the HDMS and a more detailed test of those functional elements which are required to Load the FL test code blocks from the host central processing unit (CPU). Error information is communicated to the user from the diagnostic PROMs by means of digital readouts on the control panel.

The bootstrap PROM 38 contains microprocessor code which performs the initial program loading of the operational microprocessor code from a non-user addressable cylinder of the disk drive unit, and transfers control to the operational microprocessor code once the IPL is complete. The bootstrap PROMs 38 are activated upon completion of the diagnostic PROM tests.

THE CONTROL PANEL 34

Provides the controls, indicators, and functions for power, diagnostics, warning, elapsed time, short, and storage protect.

The HDMS hierarchical memory concept, as illustrated in FIG. 2, consists of three levels of memory: large capacity storage disk drive 24 available through movable heads at medium speed, smaller size storage disk drive accessed through fixed heads with no seek time delay, and high speed cache memory 18. The bulk of the data in HDMS is stored in the movable head area. This is used typically for information such as large data fields, program overlays for attached host computers, and diagnostic programs. The average access time for up to 64.5 magabytes of data is 37 milliseconds, including seek time and latency.

Up to 131,000 bytes of data accessed through optional fixed heads are available with an average of 10 milliseconds latency delay (one-half disk revolution period). This area stores overlay programs and table indexes. The installation of the fixed heads reduces the moving head capacity to 58.6 megabytes.

An important feature of the HDMS is the availability of up to 131,000 bytes of cache memory 18. A basic application of the cache memory 18 is to supply revolving speedmatching buffers between the disk and each attached host adapter to match the high speed disk data stream with the slower I/O channels. This memory 18 also stores the microprocessor program 19 for operation of the HDMS controller. The remainder of the cache memory 18 is host-allocated into data sets containing data blocks of 256 bytes each. The data sets can be written into either the disk drive 24 or the host processors 4, 6, 8, etc.

CACHE MEMORY ALLOCATION AND CONTROL

At the completion of IPL, the nonmicroprocessor program storage area 19 of cache memory 18 is equally allocated among the host adapters 10, 12, 14, etc. present. Requests for a different amount of allocated space for host use is accomplished by an ALLOCATE command, an example of which is shown in FIG. 3. When the HDMS performs a "user requested allocate" operation as compared to the "system requested allocate" operation performed at IPL time, the requested space is taken from the total data space which was system allocated, and the requested space is assigned to the host processor 4, 6, 8, issuing the ALLOCATE command. The remaining cache memory 18 is then system allocated equally among the other host adapters in the unit which have not issued an ALLOCATE command.

The allocated host storage area may be further segmented into data sets by the DEFINE DATA SET command (see FIG. 3). Each data set consists of a user specified number of 256-byte blocks of memory, provided that the total allocated area is not exceeded. Data set 0 has the dedicated purpose of being the speed matching record buffer for data transfers to and from the disk and host adapters. Nonzero numbered data sets, in the order in which they are defined, occupy the low portion of the data space allocated to a host data processor 4, 6, 8, etc. with data set 0 occupying the remainder. Data set 0 must consist of at least one 256-byte block, matching the length of a record stored on the disk 24, to permit host-to-disk drive transfers.

When a data set is flagged for deletion by the DELETE DATA SET command and the flagged memory space is subsequently compacted by a COMPACT command, all data sets between the one deleted and data set 0 are relocated downward into the space freed by the deleted data set, and the freed space is automatically concatinated onto data set 0. The CLEAR DATA SET command clears the specified data set to 0s. The RESET SYSTEM ALLOCATION command deletes all defined data sets for all host adapters 10, 12, 14, etc.

and allocates the user-available memory space equally among all attached hosts.

Data sets numbered from 1 up to 7 are defined as permanent host storage areas until the data set is deleted by the user. The size of the data set 0 is all the allocated host storage area minus the area allocated for all currently defined data sets.

DATA SET PERFORMANCE

As an example of the utility of the powerful cache memory 18 concept using data sets, an application is described using a revolving buffer alone to transfer data as it is generated from a host computer 10 to the disk drive 24 versus the building of files in data sets over a 10-second interval and then transferring the files to the disk. Assume that 256 bytes of data are collected from each of three sensors every 0.25 second and transferred to the HDMS through an NTDS Fast channel requiring 6 microseconds per 16-bit word transferred. Comparison of the two approaches yields the results shown in the table. As can be seen the revolving buffer approach uses 18.5 times more I/O time and 29.5 times more disk transfer time than the data set approach.

TABLE

COMPARISON OF BUFFER AND
DATA SET PERFORMANCE

| Parameter | Revolving Buffer Only | Data Set |
|---|---|---|
| I/O accesses per second | 12 | 12 |
| Revolving buffers - 256-byte | 1 | |
| Data Sets | | 3 |
| Blocks per data set | | 40 |
| I/O transfers per 10 seconds | 120 | 120 |
| Disk transfers per 10 seconds | 120 | 3 |
| I/O transfer time per 10 seconds - ms | 4430* | 240 |
| Disk transfer time per 10 seconds - ms | 4430* | 150 |
| I/O utilization - % | 44.3 | 2.4 |
| Disk utilization - % | 44.3 | 1.5 |

Note:
*I/O and disk transfer times overlap

COMMAND CHAINING

Command chaining allows the user the capability of chaining individual commands together to form a command block. All commands within the block, insofar as possible, are executed before an interrupt response is generated to the host computer 4, 6, 8, etc. The interrupt response indicates the status of all completed commands within the command block or indicates an error on the first command which failed to execute completely. The entire command block is read into the controller memory 19 before processing of the first command in the block is initiated.

Consider the following sequence of commands and data in a block from a host adapter.

1. SEEK MOVABLE HEAD cylinder number 100
2. WRITE DISK
3. SEEK MOVABLE HEAD cylinder number 3
4. WRITE DISK
5. Output data block number 1
6. Output data block number 2
7. Interrupt word—command block complete The four commands, the first three of which are chained, are read into the microprocessor 30 memory. The HDMS then initiates a seek to cylinder number 100. When this seek is complete, output data block number 1 is written from the host 4 through the HA 20 to data set 0. When the transfer is complete data block number 1 is written from data set 0 to the appropriate head and record on cylinder number 100. The HDMS then begins a seek to cylinder number 3 and the sequence is repeated. When the writing of output data block number 2 is complete, the HDMS issues an interrupt word to the commanding host computer 10. Following initiation of the SEEK MOVABLE HEAD commands in the example, the microprocessor 30 polls other attached host processors 6, 8, etc. for commands which can be executed during the seeks. Requests for use of the disk drive 24, however, are placed in a queue of pending commands until the disk drive 24 is available. Following execution of the WRITE DISK command to cylinder number 100, the microprocessor 30 does not poll other HAs 6, 8, etc. but rather causes the seek to cylinder number 3 to begin, thereby retaining control of the disk drive 24.

Command chaining provides the following benefits to the user.

1. Reduces host processor interrupt word processing time.
2. Reduces host processor I/O chain activation sequences.
3. Enhances throughput for fixed sequence operations.
4. Maintains control of a disk drive for the host processor issuing the command block.
5. Permits overlapped operations among non-interfering resources.

As an example of the last benefit, data can be transferred between the host processor and one of its data sets while the disk drive is seeking to its specified cylinder prior to reading or writing data from another data set. An example is the following block sequence.

1. SEEK MOVABLE HEAD
2. READ DATA SET NUMBER (2) to host processor
3. WRITE DATA SET NUMBER (3) TO DISK Following initiation of the seek command, step 1 in FIG. 4, the microprocessor 30 advances to the next command and reads data from data set number 2 to the host processor 4 (step 2). When the seek is complete (and even before the reading of data set number 2 is complete) writing to the disk from data set number 3 is initiated. Step 2 may be temporarily suspended until the first block of step 3 is complete.

INTERLEAVED OPERATIONS

The cache memory 18 supports interleaved operations to the host processors 4, 6, 8, etc. and the disk drive 24. The transfer of a data word from the cache memory 18 to a HA 10, 12, 14, etc. data register (step 1 in FIG. 5) requires 2 microseconds. Since this may be substantially less than the transfer time required on the I/O channel, the DMA controller 28 continues to poll the other HAs 10, 12, 14 and the disk drive 24 for pending transfers (step 2 in FIG. 5). Thus several host processors 4, 6, 8, etc. may be serviced during a single host processor I/O channel transfer period.

When at least 256 bytes of data have been transferred into data set 0 and the disk drive 24 is at the correct cylinder, transfer to the disk drive is started (see step 3 in FIG. 5). Interleaving of HA 10, 12, 14 transfers within full disk block transfers is not permissible; thus steps 1 and 2 in FIG. 5 are halted until step 3 is complete. Block transfers to the disk drive 24 require approximately 2 microseconds for the first word and 1.4 microseconds for subsequent words.

Since the microprocessor 30 uses the cache memory 18 for its program storage 19, the microprocessor memory accesses are stopped during disk drive 24 and HA 10, 12, 14 transfers.

When resources such as disk drives 24 and data sets are busy, their status is reflected in an internal control word.

HDMS COMMANDS

Figure 6A:
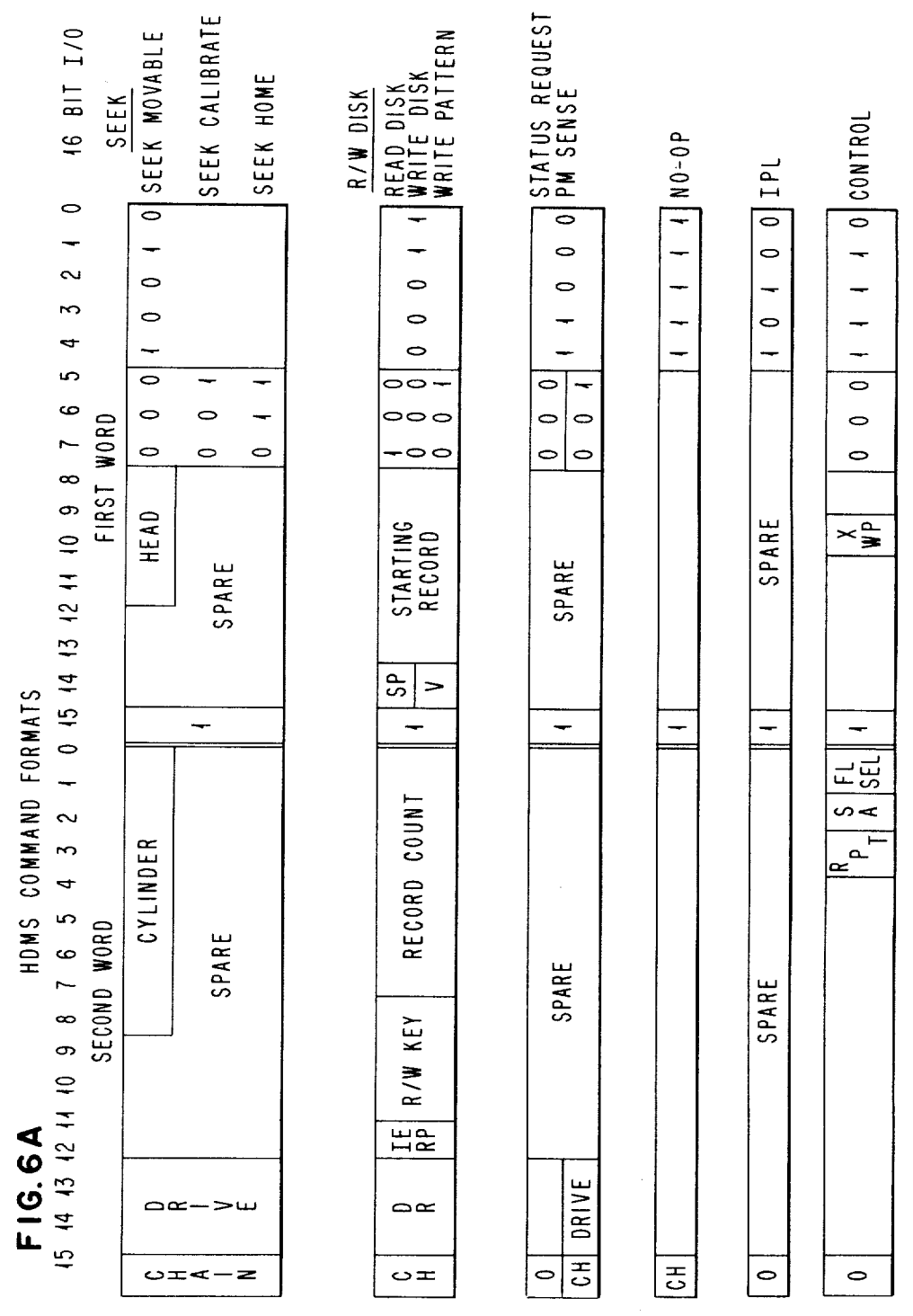

In addition to the cache memory allocation and control commands described earlier, the HDMS has seek, read and write disk, read and write data set, status and control class commands available. The read and write disk commands transfer data directly between host adapters 10, 12, 14 and the disk drive 24 using the revolving buffer, data set 0. Data set commands transfer data between the data sets and host adapters or the data sets and the disk. Detailed command formats are shown in FIG. 6.

HDMS COMMANDS

The following commands are described with respect to an HDMS containing two disk drives, DDU 0 and DDU 1.

SEEK COMMANDS
SEEK MOVABLE HEAD

This command must specify a valid disk drive 24 (DDU) head and cylinder for a subsequent READ or WRITE command. The drive field will specify DDU 0 or DDU 1 and the chain bit provides for command chaining. The HDMS performs the seek to the selected drive. If the chain bit is a 1, the HDMS initiates processing of the next command in the command block. If the next command does not address the same disk drive as the seek command, it is processed while waiting for the seek operation to complete. If the next command addresses the same drive as the SEEK command, it is not processed until the seek operation is completed. If the chain bit on a SEEK command is a 0, the HDMS waits for completion of the seek operation before issuing an interrupt word to the host processor. It is the responsibility of the user to properly chain SEEK and READ or WRITE commands to ensure that the file is positioned at the desired access position for the READ or WRITE command.

Head values greater than 9 and cylinder values greater than 357 are rejected by the HDMS. If the invalid parameters occur on a SEEK command in a command block, command chaining is terminated, and an error interrupt response is issued to the host processor.

SEEK CALIBRATE

This command calibrates the selected file's servo mechanism in disk drive 24. If access time is longer than the specified time it could indicate that the servo is out of calibration. This command may be used as part of the user system ERP after an error (R/W, seek error) is reported to the user system. It could also be used if a simple retry of the pending commands or command by the system user does not work. Execution of this command requires nominally 1.5 seconds, with a maximum of 10.0 seconds. This command is also executed automatically at power ON. At the completion of the operation of this command, the moveable head assembly is positioned at cylinder 0 and head 0 will be selected. Also at completion of this command and the chain bit is a 1, the HDMS will process the next command in the command block, otherwise a completion interrupt word is generated.

SEEK HOME

This command positions the movable head assembly of the selected drive at cylinder 0 and head 0. This command may be used as part of the user system ERP after an error (R/W, seek error, etc.) is reported to the user system. Execution of this command requires a maximum of 50 ms. At completion of this command and the chain bit is a 1, the HDMS will process the next command in the command block; otherwise, a completion interrupt word is generated.

READ AND WRITE DISK COMMANDS

If programmable data protection is enabled by placing the control panel 34 File Protect Key in the PROTECT position the READ and WRITE DISK commands operate as follows. The HDMS verifies that the key matches the lock for all the records to be read or written. If a mismatch occurs after the first record, the specified record count is adjusted downward to include only the records for which the keys match. If no match occurs, no data is transferred, command chaining is terminated, and an error interrupt is generated.

READ DISK

This command must specify a valid disk drive 24 (DDU) starting record, and a record count in the range of 0 to 255. The drive field must specify DDU 0 or DDU 1, the chain bit provides command chaining and the IERP bit when set to a 1 inhibits the error recovery procedures. The HDMS will verify the physical address, locate the specified starting record on the currently accessed head and cylinder of the selected drive and will read the 256 bytes of data contained in the record. The reading of successive records will continue until the record count plus 1 number of 256 byte records have been read from the DDU. The data will be cycle stolen to the host processor 4, 6 or 8 on a nonoverlapped basis relative to data being stolen into the controller cache memory 18 by the Controller Adapter 20 from the DDU. At the completion of the read operation, if the chain bit is set to a 1, the HDMS will initiate processing of the next command in the command block, otherwise an interrupt word will be sent to the host processor.

A starting record number exceeding 63, a record count exceeding 255, an accessing error, or a read error will cause an error interrupt word to be generated, and cause termination of the processing of commands within a command block.

WRITE DISK

This command must specify a valid disk drive 24 (DDU) starting record, and a record count in the range of 0 to 255. The drive field must specify DDU 0 or DDU 1, the chain bit provides command chaining. The HDMS will initiate output data transfers from the host computer 4, 6 or 8 and will wait until at least 256 bytes of data have been received before the specified starting record is located in the currently accessed head and cylinder of the selected disk drive. The HDMS will verify the physical address and then write the data on the DDU. The process of waiting for at least 256 bytes of user data and then writing successive records on the DDU file continues until the record count plus one number of 256-byte records are written. If the total user data blocks transferred do not equal the record count plus one number of 256-byte blocks of data, the HDMS pads the last record(s) with zeroes.

The verify bit when set causes the HDMS, after writing the entire data block, to read the entire data block before terminating the processing of the WRITE DISK command. The read process does not transfer any data to the controller cache memory 18, or the host processor 4, 6 or 8, but monitors the data for a cyclic redundancy check. The read process is terminated either when the entire data block has been read or upon the detection of an error. The verify process is performed with error recovery procedures inhibited regardless of the state of the IERP bit in the command.

At the completion of the write operation and the chain bit is set to a 1, the HDMS initiates processing of the next command in the command block; otherwise, an interrupt word is generated.

A starting record number exceeding 63, a record count exceeding 255, an accessing error, an attempt to write on a Read Only drive, or a read error causes an error interrupt word to be generated, and causes termination of the processing of commands within a command block.

WRITE PATTERN

This command must specify a valid DDU starting record, a record count in the range of 0 to 255, the drive field must specify DDU 0 or DDU 1, a chain bit to provide for command chaining and the IERP bit when set to a 1 inhibits the error recovery procedures. The HDMS accepts two 16-bit words of output data as a pattern. The HDMS will verify the physical address, locate the specified starting record on the currently accessed head and cylinder for the selected disk drive 24 and the pattern is written in the 256 bytes of the starting record and all successive records until the record count plus one number of 256 byte records have been written. The verify bit processing, the chain bit processing, and the error interrupt word conditions are the same as specified in the WRITE DISK paragraph.

READ AND WRITE DATA SET COMMANDS

READ DATA SET

This command must specify a data set number, and a block count in the range of 0 to the number of 256-byte blocks residing between the specified starting block and the end of the allocated storage area, a starting block in the range of 0 to the number of blocks present in the specified data set minus one. The HDMS will then transfer from the host storage area in the cache memory 18 to the host data processor 256 bytes of data for each block count plus one number of data blocks specified until all the data is transferred or an interface timeout occurs.

At the completion of the read operation and the chain bit is set to a 1, the HDMS initiates processing of the next command in the command block; otherwise, the HDMS generates a completion interrupt word.

If out of bounds block count and/or starting data set and block number are specified or if a nondefined data set is specified, the HDMS generates an error interrupt word and terminates processing of commands in the command block.

WRITE DATA SET

This command must specify a starting block in the range of 0 to the number of blocks present minus one in the specified data set, a data set number and a block count in the range of 0 to the number 256-byte blocks residing between the specified starting block and the end of the allocated storage area. The HDMS transfers 256-byte blocks of data from the host data processor 4, 6 or 8 to the host storage area in the cache memory 18 until the specified block count plus 1 block of data have been received or an interface timeout occurs.

At the completion of the WRITE DATA SET operation and the chain bit is set, and the HDMS initiates processing of the next command in the command block; otherwise, a completion interrupt word will be generated.

If the block count or the starting data set and block number exceeds the specified limits, or if a nondefined data set is specified, the HDMS generates an error interrupt word and terminates processing commands in the command block.

READ DISK TO DATA SET

This command must specify a valid DDU starting record, a record count in the range of 0 to 255, a data set number, a starting block number within the range of block numbers allocated for the data set, and DDU 0 or DDU 1. The chain bit provides command chaining. The HDMS will verify the physical address, locate the specified starting record on the currently accessed head and cylinder on the selected disk drive 24, and will read the 256 bytes of data contained in the starting record into the designated data set at the specified starting block number. The reading of successive records into successive blocks with specified data set continues until the record count plus 1 number of 256 byte records have been read from the DDU.

At the completion of the READ DISK TO DATA SET command and the chain bit is set, the HDMS initiates processing of the next command in the command block, otherwise a completion interrupt word is sent to the host processor 4, 6 or 8.

A starting record number exceeding 63, a record count exceeding 255, or a non-defined data set specified or a starting block number outside the range for the specified data set causes an error interrupt word to be returned to the host processor and causes command chaining to terminate. An accessing error, or a read/write error causes an error interrupt to be generated and causes termination of the processing of commands within the command block.

WRITE DATA SET TO DISK

This command must specify a valid DDU starting record, a record count in the range of 0 to 255, a data set number, a starting block number within the range of block number allocated for the specified data set, and DDU drive 0 or drive 1. The chain bit provides command chaining. The HDMS will verify the physical address and locate the specified starting record on the currently accessed head and cylinder for the selected disk drive 24. The HDMS then transfers the specified number plus 1 blocks of 256-bytes of data to the specified DDU drive starting from the specified block number within the data set.

At the completion of the WRITE DATA SET TO DISK command and the chain bit is set, the HDMS initiates processing of the next command in the command block, otherwise a completion interrupt word is sent to the host processor.

A starting record number exceeding 63, a record count exceeding 255, a non-defined data set specified, an attempt to WRITE on a READ ONLY drive, or a starting block number outside the range for the specified data set causes an error interrupt word to be returned to the host processor, and command chaining is terminated. An accessing error or a read/write error causes an error interrupt word to be generated and returned to the user, and causes termination of command block processing.

The verify bit, when set, causes the HDMS to read all the specified number of records written before terminating the processing of the WRITE DATA SET TO DISK command. The verify read process does not transfer any data back into the allocated storage area, but monitors the data for cyclic redundancy code checks.

CACHE MEMORY ALLOCATION AND CONTROL COMMANDS

ALLOCATE

This command must specify a number (in the range of 1 to 96), of 256-byte blocks of HDMS cache memory 18 to be allocated to the host data processor issuing the command. If insufficient memory space exists within the HDMS to complete the specified allocation, command chaining is terminated and an error interrupt word is returned to the host processor. If sufficient contiguous memory space exists to accommodate the specified number of 256-byte blocks, the HDMS performs the data space allocation. If the chain bit is set to a 1, the HDMS initiates processing of the next command in the command block, otherwise a completion interrupt word is sent to the host processor 4, 6 or 8.

DEFINE DATA SET

This command must specify a nonzero data set number and the number of 256-byte blocks. If the number of 256-byte blocks is within the range of the total number of 256-byte blocks allocated by the host processor 4, 6 or 8, and, when combined with prior issued data set definitions, does not exceed the allocated number minus one of 256-byte blocks of data space under control of the host processor issuing this command, the HDMS will sub-allocate the total host storage area into the specified number of blocks and will identify the contiguous blocks as the specified data set number. If the specified number of 256-byte blocks cannot be allocated within the host storage area previously allocated to the host processor 4, 6 or 8, command chaining is terminated, and an error interrupt word is returned to the host processor 4, 6 or 8. A data set previously defined cannot be redefined without first issuing the DELETE DATA SET and COMPACT DATA SET commands. An attempt to redefine the size of a currently defined data set causes command chaining to terminate and an error interrupt word to be returned to the host processor.

If the chain bit is set to a 1, the HDMS initiates processing of the next command in the command block; otherwise, a completion interrupt word is returned to the host processor 4, 6 or 8.

Data Set 0 need not be defined by the host processor, since the HDMS automatically adjusts the data set 0, the speedmatching record buffer, to be all of the total data space allocated to a host processor minus any currently defined nonzero numbered data sets.

DELETE DATA SET

This command must specify a nonzero data set number and causes the HDMS to flag the specified data set for deletion. An attempt to delete a non-defined data set or data set 0 causes the command chaining to terminate, and an error interrupt word to be returned to the host processor 4, 6 or 8. If the chain bit is set to a 1, the HDMS initiates processing of the next command in the command block; otherwise, a completion interrupt word is returned to the host processor.

COMPACT DATA SETS

This command causes the HDMS to relocate downward in the allocated host storage area the contents of all data sets physically located between any data set(s) flagged for deletion and data set 0, and to concatenate the freed storage onto data set 0. If the chain bit is set to a 1, the HDMS initiates processing of the next command in the command blocks; otherwise, a completion interrupt word is returned to the host processor 4, 6 or 8.

CLEAR DATA SET

This command must specify a data set number and causes the HDMS to clear to 0's all the bytes contained in the data set. An attempt to clear a nondefined data set causes command chaining to terminate, and an error interrupt word to be returned to the host processor 4, 6 or 8. At the completion of the valid clear data set command and the chain bit is set to a 1, the HDMS initiates processing of the next command in the command block; otherwise, a complete interrupt word is returned to the host processor.

RESET SYSTEM ALLOCATION

This command causes the HDMS to delete all defined data sets for all areas of the total HDMS cache memory 18 and to allocate the user addressable HDMS cache memory equally among the Host Adapters 10, 12 and 14 present in the HDMS. If the chain bit is set, the HDMS initiates processing of the next command in the command block; otherwise, a completion interrupt word is returned to the host processor 4, 6 or 8.

STATUS COMMANDS

STATUS REQUEST

This command causes the HDMS to generate an interrupt word to the host processor 4, 6 or 8. Command chaining beyond the STATUS REQUEST command within a command block is not permitted.

PM SENSE

This command causes the HDMS to input to the host data processor 32 bytes of performance monitoring (PM) data. If the chain bit is set, the HDMS initiates processing of the next command in the command block; otherwise, a completion interrupt word is generated and sent to the host processor 4, 6 or 8.

INITIAL PROGRAM LOAD (IPL)

This command is detected by the HDMS host adapter hardware 10, 12 and 14 and causes the HDMS to execute the diagnostic and load programs stored in the diagnostic and bootstrap programmable read only memory (PROM) 40 and 38, respectively for IPL of the HDMS microprocessor. The bootstrap load program stored in the PROM 38 will, in turn, execute a seek operation for file 0 to cylinder 358 and select head 0. When the seek is completed, a read operation will be issued reading successive records until the microprocessor program is read into the program memory 19 of the HDMS controller. This command is not chainable with any other commands and must be issued on the External Function I/O channel of the host processor 4, 6 or 8. An interrupt word is not generated in response to the IPL command.

CONTROL COMMANDS

EXTERNAL WRAP (XWP)

This command causes the HDMS to accept one data word from the host processor 4, 6 or 8 External Function channel and to return the data word on the interrupt channel. The HDMS then continues to accept one data word on the output data channel and to return the data word on the input data channel until an interface timeout occurs. The HDMS then issues a completion interrupt word. The CONTROL EXCHANGE WRAP command is not a chainable command and must be issued on the External Function I/O channel of the host processor.

FL MODE SELECT

This command causes the HDMS to accept fault localization (FL) test code blocks of Output Data from the host processor 4, 6 or 8 and upon completion of the data transfers to execute the FL test modules contained in the output data. The HDMS transfers the FL mode interrupt word to the host processor in response to this command.

The execution of the tests is stopped whenever a fault is detected and a nonzero fault group number is in the FL mode interrupt word.

FL MODE SELECT AND START ADVANCE

This command causes the HDMS in the FL test mode to continue execution with the next FL test contained in the currently loaded test module. This command should only be used if a fault was detected and the FL test operator wishes to continue testing to acquire a list of all faults in the unit before maintenance repair actions are initiated. A FL mode interrupt word is issued in response to this command.

FL MODE SELECT AND REPEAT

This command causes the HDMS in the FL test mode to repetitively execute the currently selected FL test in the currently loaded FL test module. This command should only be used if a fault was detected and it is the desire of the FL test operator to continuously re-execute the failing test. Upon the first occurrence of a fault in the repeat mode, an FL mode interrupt word will be issued to the host processor 4, 6 or 8, however, from then on in the repeat mode, no interrupt word is issued to the host processor. Exit from the repeat mode may be accomplished by use of any of the following commands.

1. IPL
2. FL MODE SELECT
3. FL MODE SELECT AND START ADVANCE

NO-OP

This command will cause no action to take place within the HDMS. If the NO-OP command is the only command issued to an HDMS, no interrupt word will be returned to the host processor 4, 6 or 8. However, if the NO-OP command is contained within an HDMS multicommand command block, then an interrupt word will be returned to the host processor to report the status of the execution of the non-NO-OP instructions in the command block.

SET LOCK

The HDMS will store the READ and WRITE lock codes contained in this command in a table in control unit storage as a function of both the disk drive 24 specified and the host adapter 10, 12 or 14 through which the command was received. These codes will be used when the P-bit in the FORMAT command is a 1.

FORMAT COMMAND

FORMAT RECORD

The HDMS will allocate a number of 256-byte records sufficient to cover the record length number, (between 4 and 4096) of 16-bit words specified in the FORMAT RECORD command. The allocation will be associated with the head and cylinder values for the specified disk drive 24 from the most recently issued SEEK or REZERO command to the same disk drive. The HDMS will enter 'no-protection' read and write lock codes when the protect (P) bit is a 0, or, when the P-bit is a 1, will associate with the record to be formatted the most recently received read and write lock codes transferred to the HDMS via the SET LOCK command. If the chain bit is set to a 1 the HDMS initiates processing of the next command in the command block; otherwise an interrupt word is generated.

EXAMPLE OF OPERATIONS

Figure 8:
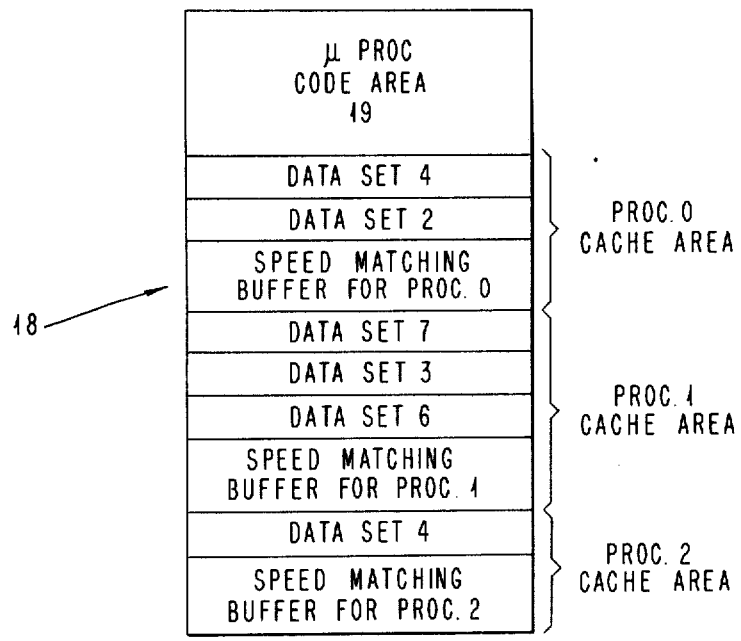
FIG. 8 is a schematic diagram of the cache memory, for an example of the operation of the invention.

FIGS. 8, 9 and 10 illustrate the operation of the HDMS system. FIG. 8 illustrates the partitioning of the cache memory 18 into cache areas which are each respectively associated with the corresponding processor. In particular, processor number 0, labeled 4, in FIG. 9, is associated with the processor 0 cache area shown in FIG. 8. Processor number 1 labeled 6 in FIG. 9, is associated with the processor 1 cache area of FIG. 8. Processor number 2 labeled 8 in FIG. 9, corresponds with the processor 2 cache area shown in FIG. 8. The illustration of operation will involve processor 0 performing a WRITE operation to the data set 2 in the processor 0 cache area of the cache memory 18, processor 1 performing a READ operation from the data set 3 in the processor 1 cache area of the cache memory 18, and processor 2 performing a WRITE operation to the disk 24 via the disk drive adapter 20 through the processor 2 cache area for the cache memory 18 shown in FIG. 8. It is to be noted that in this illustration processors 0 and 2 have data rates of 6 microseconds per word or 332 kilobytes per second into their respective host adapters HA0 labeled 10 in FIG. 9 and HA2 labeled 14 in FIG. 9, respectively. Processor 1 has a data rate of 8 microseconds per word or 250 kilobytes per second from its host adapter 1 labeled 12 in FIG. 9. The host adapters 10, 12 and 14 each respectively buffer one word or two bytes of data for instantaneous transmission or reception at a 1 megabyte per second rate over the data bus 16. For example, in the illustration of processor 0 transmitting data to the cache memory 18, the host adapter 0 will retain the two bytes of data received from the processor 0 until the DMA controller 28 authorizes the time divided access of the host adapter 0 to the bus 16, as is illustrated in the timing diagram of FIG. 10.

As is seen in FIG. 1, the DMA controller 28 has input lines 26a to the host adapter 0, 26b to the host adapter 1, 26c to the disk drive adapter 20, and 26d to the host adapter 2. The DMA controller 28 controls the time divided access of each of the host adapters and the disk drive adapter to the common data bus 16 as is illustrated by the time line A in FIG. 10. It is to be noted that when any of the host adapters HA0 through HA2 gain access to the data bus 16 they communicate at an instantaneous data rate of 1 megabyte per second whereas when the disk drive adapter 20 gains access to the common data bus 16 it communicates with the cache memory 18 at a data rate of 2 megabytes per second.

The DMA controller 28 performs a first in/first out bus allocation operation for the host adapters HA0 through HA2 and the disk drive adapter 20 and resolves simultaneous contentions for priority on a linear priority basis with the disk drive adapter having first priority, host adapter 0 having second priority, host adapter 1 having third priority, etc. For the illustration of the operation, FIG. 10 shows that processor 0 has made the first request on its control line 26a to the DMA controller 28 and DMA controller 28 has authorized a 2 microsecond access to the bus 16 via the bus port 16a, as is illustrated by the timing diagram C in FIG. 10. One microsecond later, processor 2 has requested over its line 26d to the DMA controller 28 for the access of the bus 16 and the DMA controller 28 withholds authorization of data transfer until the host adapter H0 has completed its data transfer, at which time processor 2 is given authorization for a 2 microsecond access over its port 16b to the bus 16 for the transfer of two bytes of data to its allocated portion of the cache memory 18, namely the processor 2 cache area shown in FIG. 8.

When processor 0 is transmitting through its host adapter 10 the two bytes of data to the cache memory 18, the two bytes of data were loaded into the data set 2 as is illustrated in FIGS. 8 and 9. This could have been for a simple cache storage operation where data is temporarily stored during an arithmetic process and will be subsequently retrieved in the near future. In contrast, processor 2 during the present 2 microsecond interval is transferring two bytes of data to the speed matching portion of the processor 2 cache area shown in FIGS. 8 and 9, for the purpose of accumulating 256 bytes or a full record of data in the cache memory 18.

The DMA controller 28 has a word counter 44 associated with each host adapter HA0 through HA2 and with the disk drive adapter 20 as shown in FIG. 7. In the case of the transfer of 256 bytes of data from the processor 2, via its host adapter 2 through the speed matching buffer portion of its cache area in cache memory 18, to the disk drive adapter 20, the counter associated with the processor 2 is initialized to the value 256. As each byte of data is transferred on a time divided basis over the bus 16 from the host adapter 2 to the speed matching buffer portion of the processor 2 cache area in the cache memory 18, the associated word counter 44 is decremented. Once the full complement of 256 bytes has been loaded into the speed matching buffer for the processor 2, the 0 value in the associated word counter 44 causes the DMA controller 28 to signal the interrupt controller 32 to issue an interrupt to the microprocessor 30. The microprocessor 30 will then initialize the word counter 44 in the DMA controller 28 corresponding to the disk drive adapter 20, loading the value of 256 into that counter in anticipation of the transfer of 256 bytes of data from the speed matching buffer portion of the processor 2 cache area of the cache memory 18 to the disk drive adapter 20 at the 2 megabyte per second data rate over the bus 16. The next available bus access interval on the bus 16 will be assigned to the disk drive adapter 20 over the control line 26c from the DMA controller 28 since the disk drive adapter 20 has the highest priority of all of the users connected to the bus 16. As is illustrated in time line A in FIG. 10, a 128 microsecond interval is allocated to the disk drive adapter 20 for the transfer of the 256 bytes of data at the 2 megabyte per second data rate from the cache memory 18 to the disk drive adapter 20. The duration of this interval is illustrated in timing diagram B of FIG. 10. After the word counter 44 in the DMA controller 28 associated with the disk drive adapter 20 has decremented to 0, indicating that all of the 256 bytes of data have been transferred from the speed matching buffer portion of the processor 2 cache area to the adapter 20, the DMA controller 28 assigns allocation of the bus to the next host adapter having an active request and if more than one host adapter has an active request, to that host adapter having the highest priority, which in the case illustrated in FIG. 10 is the host adapter 0, followed by the host adapter 1 and then followed by the host adapter 2.

The disk drive adapter 20 buffers the record of 256 bytes of data while the disk drive 24 is rotating the physical portion of the disk which is accessed beneath the heads. At the moment the accessed physical portion is beneath the heads, the disk drive adapter 20 starts writing the bytes of data in the record so buffered onto the disk drive 24.

A brief description will be made of how a command, such as the processor 0 issuing a write to data set 2 in the cache memory 18, is accomplished. As has been previously described, the command words are multiples of two bytes in length and are transferred from the processor, for example processor 0 to its associated host adapter HA0 in the same manner as is that for ordinary data, as has been previously described. After the host adapter 0 receives the first two bytes of the "data" command to write to the data set 2, the host adapter signals the DMA controller 28 over line 26a requesting access to the bus 16. Since there is no ongoing transfer of data between the processor 0 and the cache memory 18, a situation recognized by the DMA controller 28, the DMA controller 28 issues as the first cache store location to be accessed by the host adapter 0, the microprocessor code area 19 of the cache memory 18, as is shown in FIGS. 8 and 9. The command, which is the same as two bytes of "data", is written into the portion of the microprocessor code area 19 designated by the DMA controller 28. When the host adapter HA0 recognizes that the chain bit in the command byte is off, it signals over a control line to the interrupt controller 32 and the interrupt controller 32 then issues an interrupt to the microprocessor 30. The microprocessor 30 then reads the location in the microprocessor code area 19 which has been written into by the processor 0 and decodes the command. The microprocessor 30 then sets up the DMA controller 28 in response to the decoded command, by initializing the address counter 46 and word counter 44 associated with the host adapter 0, as shown in FIG. 7. The processor 0, in the meantime, has loaded the first two bytes of true data into the host adapter 0 and the host adapter 0 has a pending request over its line 26a to the DMA controller 28 for access to the bus 16. The DMA controller then authorizes data transfers between the host adapter 0 and the data set 2 in the cache memory 18, as has been previously discussed above, following the timing diagram C of FIG. 10.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. In a multiprocessing system, a partitionable cache store interface to a shared disk drive memory, comprising:
- a cache storage memory having a data input and output connected to a data bus communicating in common with a plurality of distributed processors and with said disk drive memory, for storing data sets for each of said processors in mutually exclusive partitions;
- a direct memory access (DMA) controller having a control line connected to each of said processors and to said disk drive memory, for receiving bus allocation demands from said processors and allocating time divided access for selected ones of said processors to said data bus for transferring data to or from corresponding ones of said partitions in said cache storage memory;
- word counter in said DMA controller having an input connected to a selected processor, for counting the quantity of data stored in the corresponding partition of said cache storage memory and initiating a bus allocation demand for said disk drive memory to obtain time divided access to said data bus for transferring data from said corresponding partition to said disk drive memory;
- whereby data can be transferred between said plurality of processors and said cache memory and between said cache memory and said disk drive memory on a time divided basis.

2. The apparatus of claim 1, which further comprises:
- a plurality of word counters in said DMA controller, each having an input respectively connected to a corresponding one of said processors, for counting the quantity of data stored in each corresponding one of said partitions of said cache storage memory and initiating a bus allocation demand for said disk drive memory to obtain time divided access to said data bus for transferring data from said corresponding partitions to said disk drive memory.

3. The apparatus of claim 1, wherein data transfers between said cache memory and said processors occurs at a first data rate and data transfers between said cache memory and said disk drive memory occur at a second data rate different from said first data rate.

4. The apparatus of claim 1, which further comprises:
- said cache storage memory including a command word partition for the storage of data transfer command words received over said data bus on a time divided basis from said distributed processors;
- a local control processor having a data line connected to said data input and output of said cache storage memory and a control line connected to said DMA controller, for accessing and decoding said command words from said cache memory;
- said local control processor signalling said DMA controller in response to one of said decoded command words, to control data transfers between said cache storage memory and said distributed processors or said disk drive memory.

5. A multiprocessing system including a partitionable cache store interface to a shared disk drive memory, comprising:
- a plurality of host adapters, each respectively connected between one of a plurality of distributed data processors and a common data bus;
- a disk adapter connected between said disk drive memory and said common data bus;
- a cache storage memory having a data input and output connected to said data bus for storing data sets for each of said processors in mutually exclusive partitions;
- a direct memory access (DMA) controller having a control line connected to each of said host adapters and to said disk adapter, for receiving bus allocation demands from said processors and allocating time divided access for selected ones of said processors to said data bus for transferring data to or from corresponding ones of said partitions in said cache storage memory;
- a word counter in said DMA controller having an input connected to a selected host adapter, for counting the quantity of data stored in the corresponding partition of said cache storage memory and initiating a bus allocation demand for said disk drive memory to obtain time divided access to said data bus for transferring data from said corresponding partition to said disk drive memory;
- whereby data can be transferred between said plurality of processors and said cache memory and between said cache memory and said disk drive memory on a time divided basis.

6. The apparatus of claim 5, which further comprises:
- a plurality of word counters in said DMA controller, each having an input respectively connected to a corresponding one of said host adapters, for counting the quantity of data stored in each corresponding one of said partitions of said cache storage memory and initiating a bus allocation demand for said disk drive memory to obtain time divided access to said data bus for transferring data from said corresponding partitions to said disk drive memory.

7. The apparatus of claim 5, wherein data transfers between said cache memory and said host adapters occurs at a first data rate and data transfers between said cache memory and said disk adapter occur at a second data rate different from said first data rate.

8. The apparatus of claim 5, which further comprises:
- said cache storage memory including a command word partition for the storage of data transfer command words received over said data bus on a time divided basis from said distributed processors;
- a local control processor having a data line connected to said data input and output of said cache storage memory and a control line connected to said DMA controller, for accessing and decoding said command words from said cache memory;

said local control processor signalling said DMA controller in response to one of said decoded command words, to control data transfers between said cache storage memory and said host adapters or said disk adapter.

9. In a multiprocessing system, a partitionable cache store interface to a shared disk drive memory, comprising:

a cache storage memory having a data input and output connected to a data bus communicating in common with a plurality of distributed processors and with said disk drive memory, for storing data sets for each of said processors in mutually exclusive partitions;

a direct memory access (DMA) controller having a control line connected to each of said processors and to said disk drive memory, for receiving bus allocation demands from said processors and allocating time divided access for selected ones of said processors or said disk drive memory to said data bus for transferring data to or from corresponding ones of said partitions in said cache storage memory;

said cache storage memory including a command word partition for the storage of data transfer command words received over said data bus on a time divided basis from said distributed processors;

a local control processor having a data line connected to said data input and output of said cache storage memory and a control line connected to said DMA controller, for accessing and decoding said command words from said cache memory;

said local control processor signalling said DMA controller in response to one of said decoded command words, to control data transfers between said cache storage memory and said distributed processors or said disk drive memory.

10. The apparatus of claim 9, wherein data transfers between said cache memory and said processors occurs at a first data rate and data transfers between said cache memory and said disk drive memory occur at a second data rate different from said first data rate.

11. In a multiprocessing system, a partitionable cache store interface to a shared disk drive memory, comprising:

a cache storage memory having a data input and output connected to a data bus communicating in common with a plurality of distributed processors and with said disk memory, for storing data sets for each of said processors in mutually exclusive partitions;

a direct memory access (DMA) controller having a control line connected to each of said processors and to said disk drive memory, for receiving bus allocation demands from said processors and allocating time divided access for selected ones of said processors to said data bus for transferring data to or from corresponding ones of said partitions in said cache storage memory;

a plurality of word counters in said DMA controller, each having an input respectively connected to a corresponding one of said processors, for counting the quantity of data stored in each corresponding one of said partitions of said cache storage memory and initiating a bus allocation demand for said disk drive memory to obtain time divided access to said data bus for transferring data from said corresponding partitions to said disk drive memory;

said cache storage memory including a command word partition for the storage of data transfer command words received over said data bus on a time divided basis from said distributed processors;

a local control processor having a data line connected to said data input and output of said cache storage memory and a control line connected to said DMA controller, for accessing and decoding said command words from said cache memory;

said local control processor signalling said DMA controller in response to one of said decoded command words, to control data transfers between said cache storage memory and said distributed processors or said disk drive memory;

whereby data can be transferred between said plurality of processors and said cache memory and between said cache memory and said disk drive memory on a time divided basis.

12. A multiprocessing system including a partitionable cache store interface to a shared disk drive memory, comprising:

a plurality of host adapters, each respectively connected between one of a plurality of distributed data processors and a common data bus;

a disk adapter connected between said disk drive memory and said common data bus;

a cache storage memory having a data input and output connected to said data bus for storing data sets for each of said processors in mutually exclusive partitions;

a direct memory access (DMA) controller having a control line connected to each of said host adapters and to said disk adapter, for receiving bus allocation demands from said processors and allocating time divided access for selected ones of said processors to said data bus for transferring data to or from corresponding ones of said partitions in said cache storage memory;

a plurality of word counters in said DMA controller, each having an input respectively connected to a corresponding one of said host adapters, for counting the quantity of data stored in each corresponding one of said partitions of said cache storage memory and initiating a bus allocation demand for said disk drive memory to obtain time divided access to said data bus for transferring data from said corresponding partitions to said disk drive memory;

said cache storage memory including a command word partition for the storage of data transfer command words received over said data bus on a time divided basis from said distributed processors;

a local control processor having a data line connected to said data input and output of said cache storage memory and a control line connected to said DMA controller, for accessing and decoding said command words from said cache memory;

said local control processor signalling said DMA controller in response to one of said decoded command words, to control data transfers between said cache storage memory and said host adapters or said disk adapter;

whereby data can be transferred between said plurality of processors and said cache memory and between said cache memory and said disk drive memory on a time divided basis.

* * * * *